United States Patent
Funari

(10) Patent No.: US 8,615,821 B2
(45) Date of Patent: Dec. 31, 2013

(54) ACTUATOR HAVING A CLUTCH ASSEMBLY

(75) Inventor: Michael A. Funari, Apex, NC (US)

(73) Assignee: Zurn Industries, LLC, Erie, PA (US)

( * ) Notice: Subject to any disclaimer, the term of this patent is extended or adjusted under 35 U.S.C. 154(b) by 1307 days.

(21) Appl. No.: 12/129,849

(22) Filed: May 30, 2008

(65) Prior Publication Data

US 2009/0077730 A1    Mar. 26, 2009

Related U.S. Application Data

(60) Provisional application No. 60/932,545, filed on May 31, 2007.

(51) Int. Cl.
*E03D 1/00* (2006.01)

(52) U.S. Cl.
USPC .................................. 4/313; 4/406

(58) Field of Classification Search
USPC ............ 4/313, 406; 192/56.56, 56.61; 464/38
See application file for complete search history.

(56) References Cited

U.S. PATENT DOCUMENTS

| | | |
|---|---|---|
| 3,471,868 A | 10/1969 | Zorn |
| 3,482,268 A | 12/1969 | Teshima |
| 4,141,091 A | 2/1979 | Pulvari |
| 4,225,986 A | 10/1980 | Mauk |
| 4,338,690 A | 7/1982 | Hsieh et al. |
| 4,392,260 A | 7/1983 | Bensen |
| 4,485,501 A | 12/1984 | Kloner |
| 4,575,880 A | 3/1986 | Burgess |
| 4,707,867 A | 11/1987 | Kawabe et al. |
| 4,941,215 A | 7/1990 | Liu |
| 5,003,643 A * | 4/1991 | Chung ............................. 4/313 |
| 5,036,553 A | 8/1991 | Sanderson |
| 5,187,816 A | 2/1993 | Chiou |
| 5,187,818 A | 2/1993 | Barrett, Sr. et al. |
| 5,228,146 A | 7/1993 | Martell |
| 5,307,524 A * | 5/1994 | Veal ............................ 4/246.1 |
| 5,313,674 A | 5/1994 | Chiang et al. |
| 5,400,446 A * | 3/1995 | Bloemer et al. .................. 4/408 |
| 5,448,784 A | 9/1995 | Smiley |
| 5,455,971 A | 10/1995 | Sakakibara et al. |
| 5,469,586 A | 11/1995 | Tsutsui et al. |
| 5,482,250 A | 1/1996 | Kodaira |
| 5,603,127 A | 2/1997 | Veal |
| 5,855,027 A | 1/1999 | Macedo |
| 5,901,384 A | 5/1999 | Sim |
| 5,950,983 A | 9/1999 | Jahrling |
| 6,056,261 A | 5/2000 | Aparicio et al. |
| 6,065,379 A * | 5/2000 | Shinno et al. ..................... 83/30 |
| 6,161,814 A | 12/2000 | Jahrling |

(Continued)

*Primary Examiner* — Korie H Chan
(74) *Attorney, Agent, or Firm* — The Webb Law Firm

(57) ABSTRACT

A clutch assembly is provided for coupling a drive shaft with a drive arm of an actuator for use with an automatic toilet flushing system, wherein the drive shaft is adapted for rotation via a motor in the actuator. The clutch assembly includes a rotatable body extending between the drive shaft and the drive aim and having a first engaging member. A clutch disk is secured to the drive shaft and includes a second engaging member adapted for cooperating with the first engaging member of the body. A fastener secures the clutch disk to the drive shaft and a biasing member is provided for biasing the body toward the clutch disk. The body is adapted to overcome the biasing force of the biasing member should a predetermined torque on the drive shaft be exceeded to disengage the first and second engaging members and prevent damage to the drive shaft.

25 Claims, 11 Drawing Sheets

(56) References Cited

U.S. PATENT DOCUMENTS

| | | |
|---|---|---|
| 6,202,227 B1 | 3/2001 | Gurowitz |
| 6,206,340 B1 | 3/2001 | Paese et al. |
| 6,212,697 B1 | 4/2001 | Parsons et al. |
| 6,237,165 B1 | 5/2001 | Chen et al. |
| 6,263,519 B1 | 7/2001 | Parsons et al. |
| 6,499,152 B2 | 12/2002 | Johnson |
| 6,513,787 B1 | 2/2003 | Jeromson et al. |
| 6,560,790 B2 | 5/2003 | Saar et al. |
| 6,568,655 B2 | 5/2003 | Paese et al. |
| 6,598,245 B2 | 7/2003 | Nishioka |
| 6,618,864 B2 | 9/2003 | Veal |
| 6,619,614 B2 | 9/2003 | Parsons et al. |
| 6,860,282 B2 | 3/2005 | Guler |
| 6,979,268 B2 * | 12/2005 | Peters et al. ............ 464/39 |
| 7,488,275 B2 * | 2/2009 | Warner et al. ............ 482/57 |
| 2002/0029412 A1 | 3/2002 | Veal |
| 2002/0092090 A1 | 7/2002 | Johnson |
| 2002/0162166 A1 | 11/2002 | Saar et al. |
| 2003/0019022 A1 | 1/2003 | Wilson et al. |
| 2003/0074725 A1 | 4/2003 | Pino |
| 2003/0102448 A1 | 6/2003 | Parsons |
| 2003/0102449 A1 | 6/2003 | Parsons et al. |
| 2003/0102450 A1 | 6/2003 | Parsons et al. |
| 2003/0116736 A1 | 6/2003 | Muderlak |
| 2004/0040079 A1 | 3/2004 | Snyder |
| 2004/0068784 A1 | 4/2004 | Muderlak |
| 2004/0154087 A1 | 8/2004 | Hogues, Jr. |
| 2005/0076425 A1 | 4/2005 | Contadini |
| 2006/0277674 A1 | 12/2006 | Oakes, Jr. |
| 2008/0072369 A1 | 3/2008 | Funari, Jr. |
| 2008/0196151 A1 | 8/2008 | Oakes Jr. |

* cited by examiner

ACTUATOR HAVING A CLUTCH ASSEMBLY

CROSS REFERENCE TO RELATED APPLICATION

This application is based on Provisional Patent Application No. 60/932,545, filed May 31, 2007, entitled "Actuator Having a Clutch", on which priority of this patent application is based, and which is hereby incorporated by reference in its entirety.

BACKGROUND OF THE INVENTION

1. Field of the Invention

The present invention relates generally to automatic toilet flushing systems and, more particularly, to an automatic actuator having a clutch assembly for flushing toilets, such as home toilets or other toilets found in private dwellings or facilities.

2. Description of Related Art

There are many commercially available automatic toilet flushing systems for use in various commercial and industrial establishments. Also, automatic toilet flushing systems for use in conventional home toilets or other toilets found in private dwellings have been disclosed, for example, in U.S. Pat. Nos. 4,141,091 to Pulvari; 5,003,643 to Chung; and 6,202,227 to Gurowitz. These prior art automatic flushing systems for conventional toilet flushing systems are desirable for a variety of reasons, for example, sanitary considerations by one not having to touch a handle used by others. Also, people suffering from temporary or permanent disabilities may find it difficult to access a toilet flush handle, which is usually located rearwardly of the toilet seat. In other cases, forgetfulness or non-attentiveness of individuals may prevent them from manually flushing the toilet. In these and other situations, an automatic toilet flushing system for private dwelling structures may provide a significant advantage.

In the prior art automatic toilet flushing systems, converting a conventional toilet to one capable of automatic flushing after use can oftentimes be difficult and relatively expensive, such as requiring new or substituted toilet fixtures. Automatic flushing systems include an automatic actuator that is coupled with a flapper valve to release water from the reservoir tank upon receipt of a flushing signal. Occasionally, these flapper valves can get caught on something and fail to open, causing the application of excessive torque to the actuator motor. This can result in the motor becoming overheated. Therefore, there is a need to provide an automatic toilet flushing system that is easy to install on conventional toilets while using the existing toilet fixtures, including the existing toilet components, for example, the toilet bowl and reservoir tank for holding water that may constitute a conventional or standard toilet. There is a further need to provide a device capable of avoiding the application of this excessive torque to the actuator motor.

SUMMARY OF THE INVENTION

The present invention has met these needs. More particularly, the invention provides an automatic toilet flushing system for a toilet having a reservoir tank and a toilet bowl. The system includes a sensor for sensing the approach and departure motion of a user with respect to the toilet and for generating a signal representative of the approach and departure motion of the user; an actuator in communication with the sensor for causing an automatic flushing of the toilet in response to the signal from the sensor, wherein the actuator includes a drive shaft coupled to a drive arm via a clutch assembly; and a flushing mechanism co-acting with the actuator. The flushing mechanism includes a flapper valve connected to the drive arm, wherein the flapper valve is adapted to release water from the reservoir tank upon actuation of the toilet flushing system.

In an embodiment of the invention, the actuator is a mechanical actuator and has a gear train, a motor with an output shaft rotatably connected to the gear train, a pivotal arm having a drive shaft rotatably connected to the gear train, and a power source for activating the motor and rotating the output shaft of the motor which, in turn, rotates the gear train for pivotal movement of the drive shaft of the pivotal arm, and, therefore, pivotal movement of the pivotal arm. The flushing mechanism includes a flapper valve for releasing water out of the reservoir tank and into the toilet bowl, and the drive arm of the pivotal arm is connected to the flapper valve for operation of the flapper valve upon the pivotal movement of the drive shaft connected to the pivotal arm.

The actuator box has an opening in the sidewall of the second compartment, and the shaft connected to the pivotal arm of the actuator extends through the opening in the sidewall of the second compartment for supporting the pivotal arm outside of the actuator box. The pivotal arm may be connected to the flapper valve via a handle swivel connected at the end of the pivotal arm and a connector member, e.g., a chain attached to the handle swivel and the flapper valve or via a tab connected at the end of the pivotal arm and a connector member, e.g., a chain attached to the tab and to the flapper valve.

The sensor senses the approach and departure motion of a user with respect to the toilet and, in an embodiment of the invention, includes a housing having a body that defines a first section and a second section. The first section has a first closed end, a second open end, and first and second openings. The first opening has a signal generating source for transmitting a signal, and the second opening has a signal detector for receiving the transmitted signal from the signal generating source in the first opening, thereby detecting the presence of a user of the toilet.

According to a further embodiment of the invention, a clutch assembly is provided for coupling a drive shaft with a drive arm of an actuator for use with an automatic toilet flushing system. The drive shaft is adapted for rotation via a motor in the actuator. The clutch assembly includes a rotatable body extending between the drive shaft and the drive arm. The body includes a male member extending in an outward direction with respect to the body. A clutch disk is secured to the drive shaft. This clutch disk includes a female member adapted for cooperating with the male member of the body. A fastening member is provided for securing the clutch disk to the drive shaft. The fastening member includes a head positioned a predetermined distance from the body and a biasing member is caged between this head and the clutch disk. The body is adapted to overcome this biasing force should a predetermined torque on the drive shaft be exceeded to disengage the male member of the body from the female member of the clutch disk and prevent damage to the actuator motor.

It is therefore an object of the invention to provide a clutch assembly coupled to an actuator for an automatic toilet flushing system wherein the clutch assembly is capable of disengaging the actuator from a drive arm of the flushing mechanism should a predetermined torque applied to this drive arm be exceeded to prevent damage to the motor of the actuator.

These and other objects and advantages of the present invention will be better appreciated and understood by those skilled in the art from the following description and appended claims. It is to be understood, however, that the drawings are for the purpose of illustration and description only and are not intended as a definition of the limits of the invention.

DETAILED DESCRIPTION OF THE INVENTION

Figure 1:
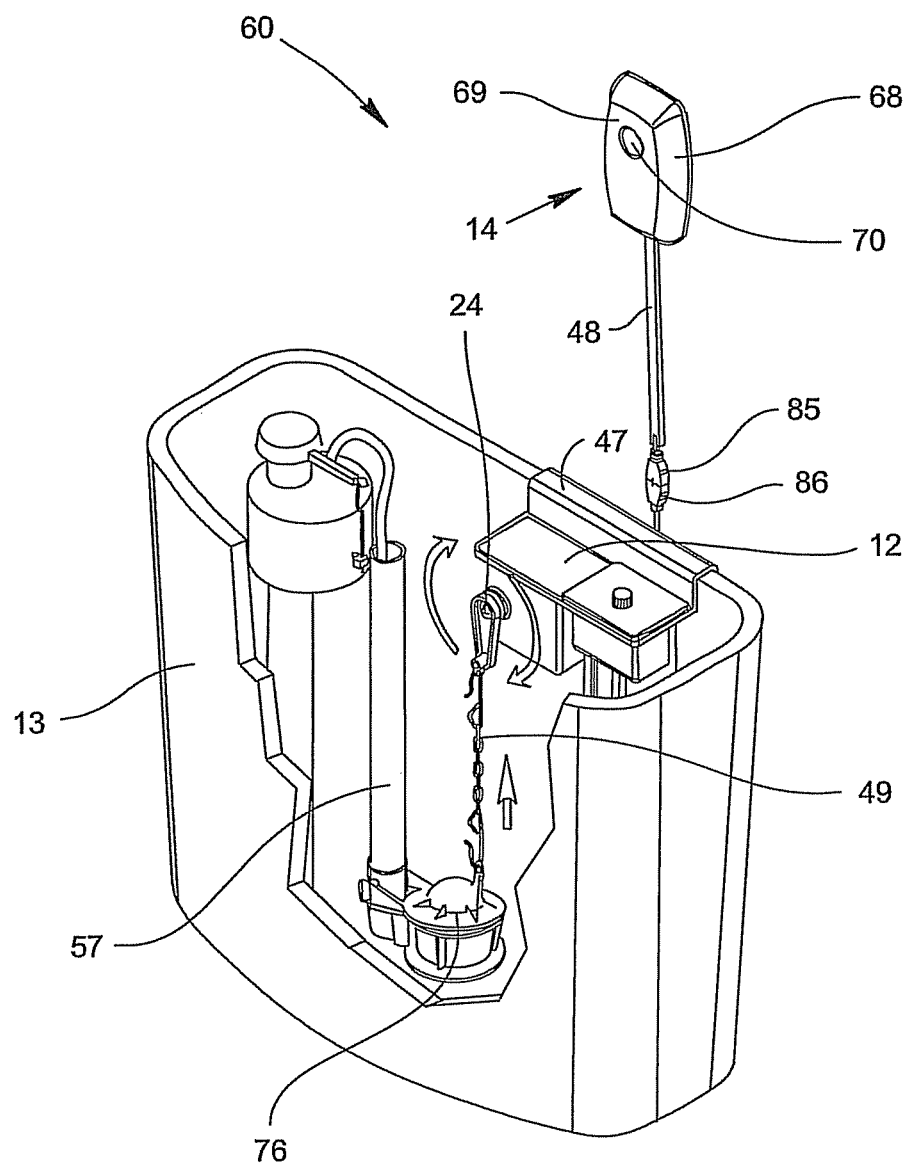
FIG. 1 is a perspective view of the actuator having a clutch connected to the flapper valve installed in the reservoir tank in accordance with the present invention and showing a sensor arrangement according to a first design.
Figure 2:
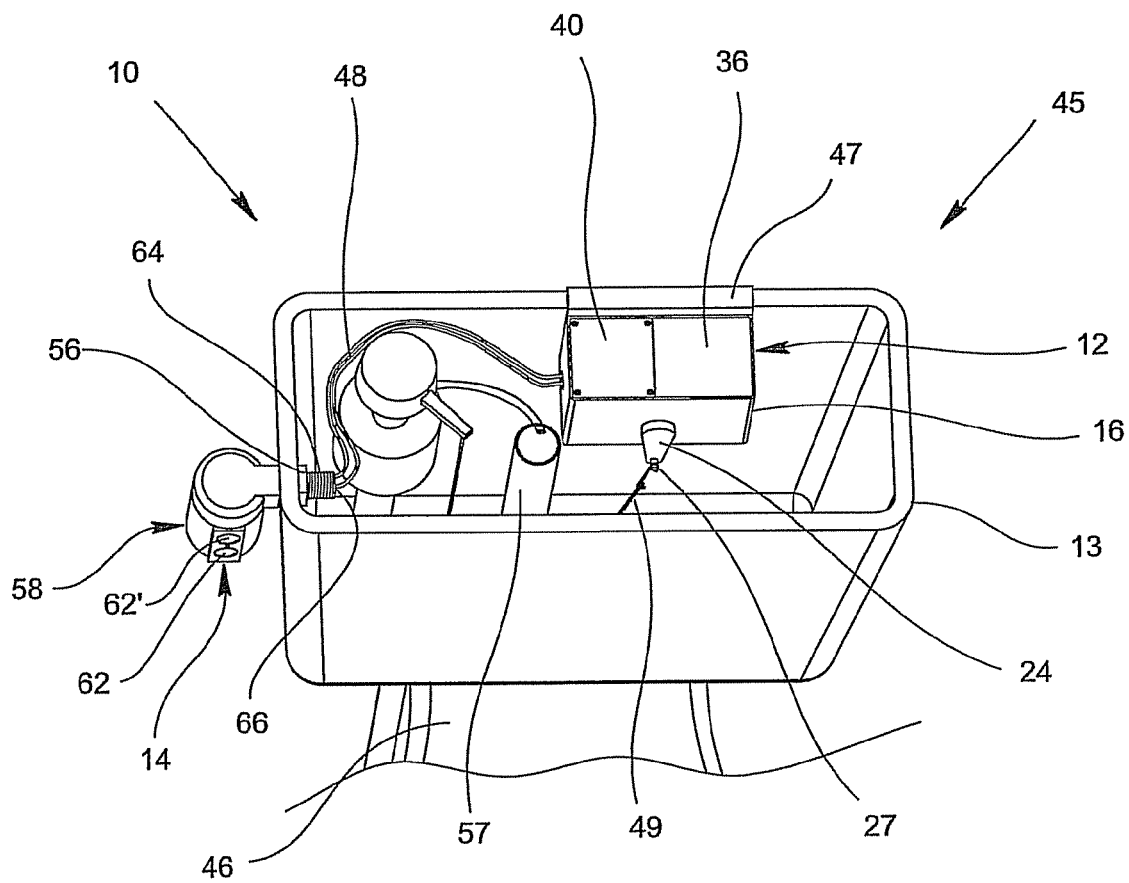
FIG. 2 is a top perspective view of an actuator housed in an actuator box installed in a reservoir tank for an automatic toilet flushing system made in accordance with the present invention and showing a sensor arrangement according to a second design.

Referring to FIGS. 1 and 2, the invention provides an automatic toilet flushing system 10, 60 for a conventional toilet 45, which has a toilet bowl 46 and a reservoir tank 13. The automatic toilet flushing system 10 includes an actuator 12 mounted in the reservoir tank 13 via a bracket 47 and in communication with a sensor 14, which is mounted into a sidewall of the conventional toilet 45. The sensor 14 may be in communication with the actuator 12 via a wire 48 or via a transmitted signal (i.e., wireless communication). In the wireless communication arrangement, a radio frequency transmitter can be provided in the sensor 14 and a corresponding radio frequency receiver may be provided in the actuator 12. Referring to FIG. 3B, the actuator 12 is housed in an actuator box 16 and includes a gear train 18, a motor 20 having an output shaft 22, and an external rotating arm 24 having a shaft 26. The output shaft 22 of the motor 20 is rotatably connected to the gear train 18, and the external arm 24 is rotatably connected to the gear train 18 via shaft 26. A power source, such as a battery 28, is electrically connected to the motor 20. For wireless communication, a signal transmission receiver (not shown) in communication with both the sensor 14 and the motor 20 may be used to receive transmitted signals from the sensor 14, thus activating and/or deactivating the motor 20. It is conceivable that the power could be provided via an electric line from an external power source coupled directly to the battery 28.

Figure 3A:
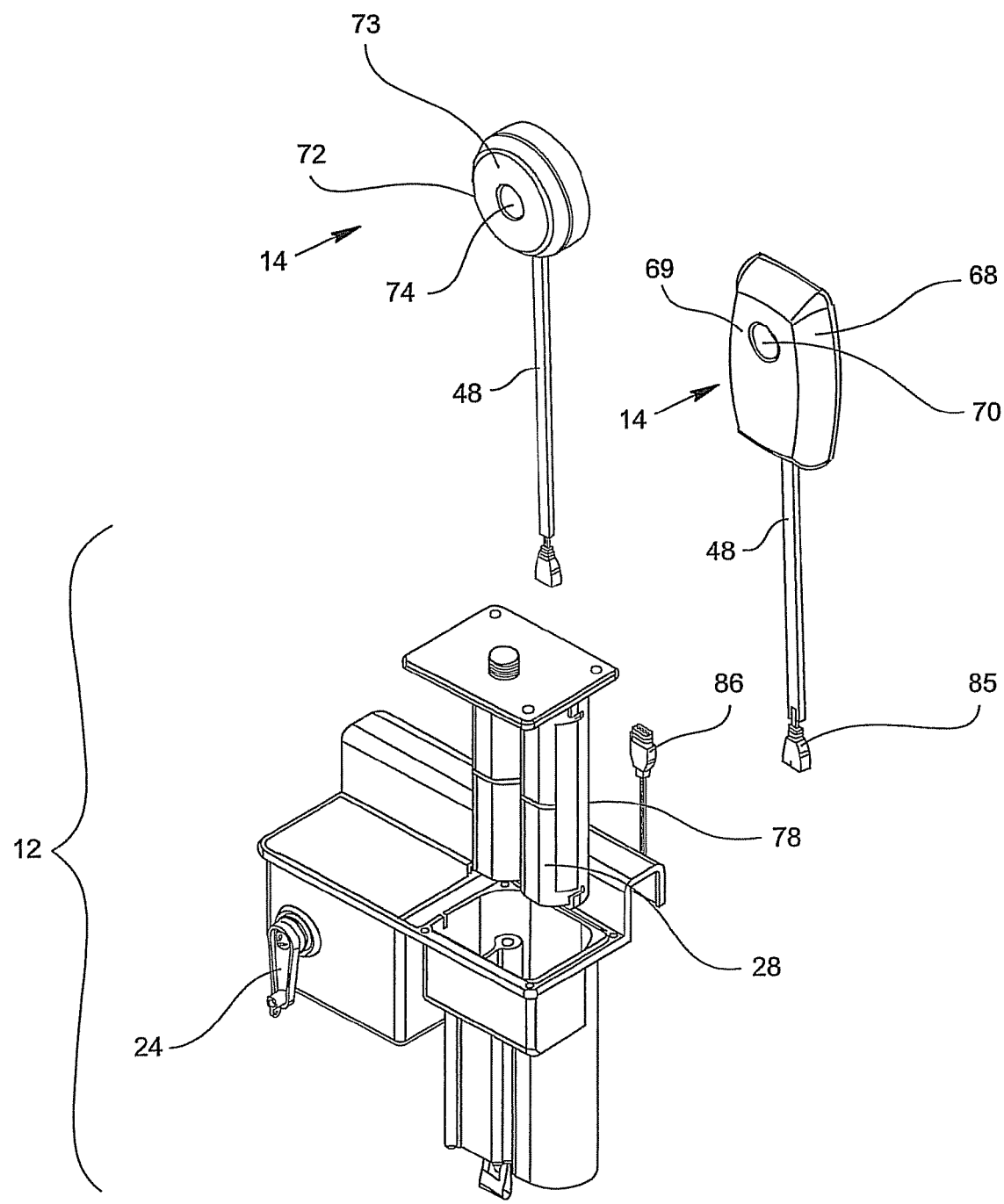
FIG. 3A is a perspective view of the actuator with the battery tray exposed and the sensors to which the actuator can be electrically coupled.
Figure 3B:
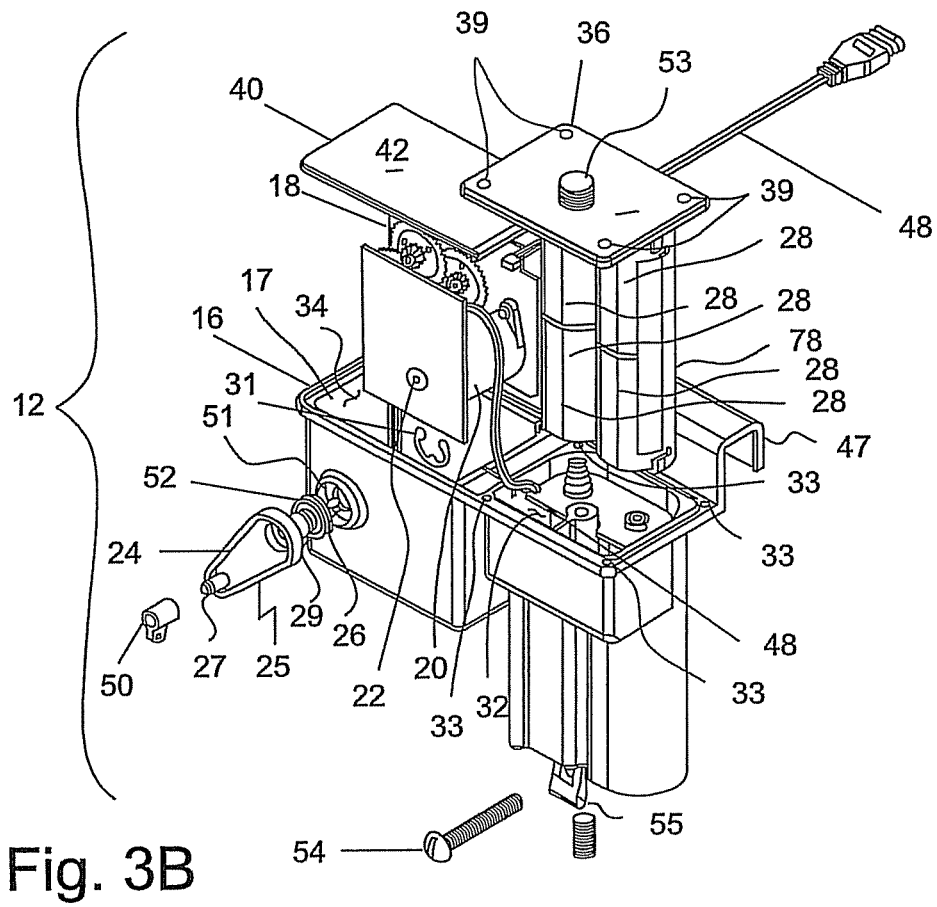
FIG. 3B is an exploded front perspective view of an actuator shown in FIGS. 1 and 2.
Figure 3C:
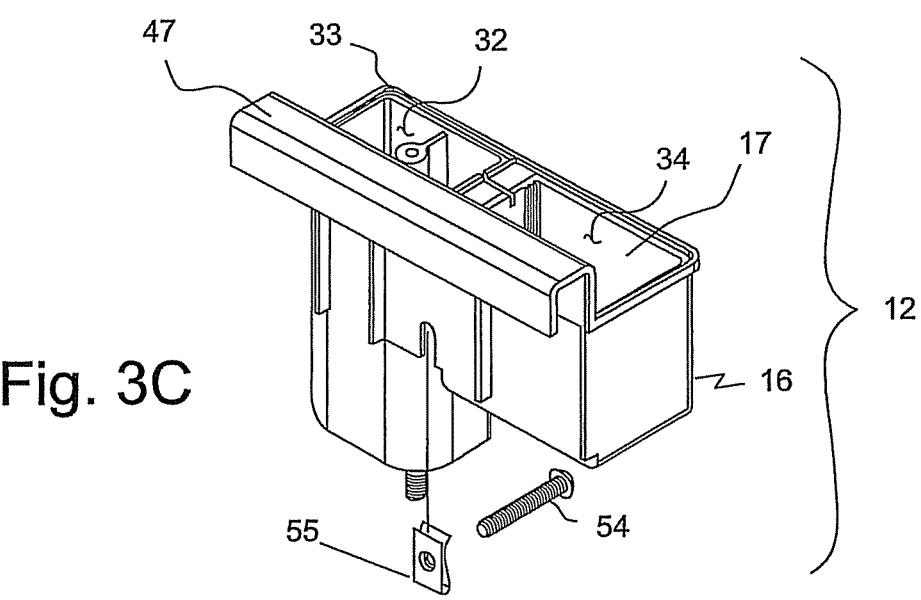
FIG. 3C is a rear perspective view of an actuator box shown in FIG. 3B.

FIGS. 3A-3C show the actuator box 16 of the automatic flushing system 10 having an open end 17 defining a first compartment 32 and a second compartment 34. As shown in FIG. 3B, the first compartment 32 of the actuator box 16 can be used to house the battery 28 and a signal transmission receiver for wireless communication (not shown), and the second compartment 34 can be used to house the gear train 18 and the motor 20. Referring to FIGS. 3B and 3C, the open end 17 of the first compartment 32 of the actuator box 16 defines a plurality of holes 33 adapted to receive fasteners. The actuator box 16 is preferably made of a unitary piece of molded plastic so as to be resistant to water and chemicals normally present in a toilet/bathroom environment.

Referring particularly to FIG. 3B, the external arm 24 is pivotably mounted on the outside of the actuator box 16, wherein the shaft 26 of the external arm 24 extends through an opening 51 in a sidewall of the actuator box 16, thus connecting the external arm 24 to the gear train 18. When the motor 20 is activated, the output shaft 22 of the motor 20 rotates the gear train 18, thereby pivotably rotating the external arm 24.

Referring again to FIG. 3B, a first cover 36 having a body 38 and defining a plurality of slots 39 is used to cover the first compartment 32 of the actuator box 16. The first cover 36 can be attached to the open end 17 of the first compartment 32 of the actuator box 16 via a fastener (not shown) passing through slot 39 defined in the cover body 38 of cover 36 and hole 33 defined in the actuator box 16.

Still referring to FIG. 3B, a second cover 40 having a body 42 may be used to cover the second compartment 34 of the actuator box 16. The second cover 40 is preferably sealed to the open end 17 of the second compartment 34 of the actuator box 16 by sonic welding. A gasket, such as an O-ring (not shown), can be inserted between the covers 36, 40 and the open end 17 of the actuator box 16 to seal the compartments 32, 34, thus preventing moisture from entering.

Still referring to FIG. 3B, the gear train 18 is used to rotate the external arm 24 of the actuator 12. The external arm 24 includes a body 25, wherein the shaft 26 is defined at one end of the body 25 and extends therefrom, and a tab 27 is defined at an opposite end of the body 25 and extends in a direction opposite that of the shaft 26. The shaft 26 of the body 25 of the external arm 24 is keyed to the gear train 18, and the tab 27 of the body 25 of the external arm 24 is connected to a flapper valve 76 via a bead chain 49 as particularly shown in FIG. 1. A handle swivel 50 co-acting with the tab 27 can also be used to connect the external arm 24 to the flapper valve 76. This handle swivel 50 is rotatably coupled to shaft 30 so that it may swivel about a longitudinal axis passing through shaft 30. The handle swivel 50 has a guide (not shown) that is received in a recess on shaft 30 to hold the handle swivel 50 in place and permit it to rotate. A sealing arrangement 29 is defined between the shaft 26 and the body 25 of the external arm 24 in order to pivotably attach the external arm 24 to the actuator box 16. A gasket, such as an O-ring (not shown) or cup seal 52, may be used to seal the opening in the actuator box 16 around the shaft 26 of the external arm 24, thus preventing moisture from entering the actuator box 16. A clip 31, such as an E-clip defined in the second compartment 34, may also be used to secure the external arm 24 to the outside of the actuator box 16.

Still referring to FIG. 3B, the actuator 12 includes a battery tray 78 which supports several batteries 28 in first compartment 32. The batteries 28 may be disposable or rechargeable. The first cover 36 of the first compartment 32 includes a thumb screw 53 used in conjunction with a gasket (not shown) to seal the first compartment 32. A stabilizing arrangement, such as the use of a clip, screw and knurled insert represented by elements 54 and 55, can be used to further secure the actuator 12 to the tank reservoir 13 as shown in FIGS. 3B and 3C. Such an arrangement is disclosed in U.S. patent application Ser. No. 11/789,034, which is hereby incorporated by reference.

The sensor 14 of the automatic flushing system 10 detects when a human body comes within a predetermined distance with respect to a toilet bowl (not shown). The sensor 14 can be mounted on a wall in close proximity to actuator 12, such as shown in the design of FIG. 1, or it can be located in the manual flush handle hole of a conventional toilet, thus replacing the manual flush handle as shown according to the design of FIG. 2. However, the sensor 14 can be located anywhere in the bathroom as long as it can detect a person approaching the toilet. The sensor 14 preferably uses ultrasound technology to detect a user near the toilet. By using ultrasound technology, false detection due to moisture, such as steam, is eliminated. Also, ultrasound technology is not sensitive to color and can operate in all shades of light. The sensor 14 can also utilize magnetic, electrostatic, optical, and electromagnetic principles for detection of a person in the vicinity of the sensor 14. Other types of sensors may be used, such as heat sensors and infrared sensors.

As shown in FIG. 2, the sensor 14 includes a housing 58, which is preferably made of a material that is resistant to chemicals and water, such as a polymeric material. A plurality of openings 62, 62' are provided wherein the ultrasound generating source (not shown) can transmit ultrasound waves passing through the opening 62, and an ultrasound detector (not shown) can receive ultrasound transmissions passing through opening 62', thus detecting a user at the toilet. Alternatively, openings 62 and 62' can be an infrared transmitter and receiver, respectively. Infrared transmitters and receivers are well-known in the art.

Referring to FIG. 2, the sensor 14 can be mounted into the flush handle hole of the toilet 45, via a nut 56 threadably fastened to a threaded portion of the member 64. The sensor 14 is electrically connected to the motor 20 in the actuator box 16 via the wire 48 passing through the center passageway 66 of the member 64 and sandwiched between the first cover 36 and actuator box 16, as shown in FIG. 1. The wire 48 should be thin enough to allow the first cover 36 to seal properly, thus preventing moisture from entering the actuator box 16. However, grommets or other types of seals or sealants can be used for the wire 48 to pass through the actuator box 16.

An alternative design for an automatic toilet flushing system 60 is shown in FIGS. 1 and 3A. In this design, the sensor 14 can have a rectangular design 68, or a round design 72 having a housing 69, 73 that is mounted on a wall in close proximity to actuator 12. The housing 69, 73 includes a sensor element 70, 74. The sensor element 70, 74 can be an infrared sensor that is well-known in the art to detect the presence of a user. The sensor housing 69, 73 is preferably mounted on a wall in close proximity to actuator 12. However, it can be appreciated that sensor housing 69, 73 may be located anywhere in the bathroom as long as it can detect a user near the toilet. The sensor housing 69, 73 can house all of the internal components of sensor 14, including a transmitter for wireless communication (not shown), thereby eliminating the need for a physical connection, such as a wire 48 between the sensor 14 and the actuator 12. For wireless communication, the transmitter can transmit a signal from the sensor element 70, 74 to a signal transmission receiver (not shown) in the actuator box 16, for example, by radio frequency transmissions.

The sensor housing 69, 73 can be attached to a wall or an object using mechanical fasteners, adhesive tape or other means known in the art. The wire 48 can use female/male connector 85, 86 to attach the sensor 14 to the actuator 12.

In a conventional toilet 45, with which the automatic flushing system 10 and 60 may be used, the toilet 45 comprises a toilet bowl 46 and a reservoir tank 13 (also referred to as a water chest) located immediately rearwardly of and above the toilet bowl 46, as best shown in FIG. 2. In this way, water is allowed to drain from the reservoir tank (13 by the force of gravity directly into the toilet bowl 46 through conventional plumbing connections. Referring particularly to FIGS. 1 and 2, the toilet is generally provided with the flush handle normally located on the side of the reservoir tank 13 and which operates a flushing mechanism 57 located within the reservoir tank 13. This flushing mechanism 57 typically includes the flapper valve 76 which is located at the lower end of the reservoir tank 13 and which can be opened and closed with respect to a water outlet 88 covered by the flapper valve 76 for releasing water into the toilet bowl 46. Referring to FIGS. 1 and 2, the actuator 12 is mounted to a ledge of the reservoir tank 13 via the bracket 47, and the chain 49 connects the actuator 12 to the flapper valve 76 (shown best in FIG. 1). One end of the chain 49 is connected to the handle swivel 50 on the external arm 24 and the opposite end of the chain 49 is connected to the flapper valve 76.

In operation, the sensor 14 transmits a signal, such as ultrasound waves or infrared signals, through opening 62 of the sensor housing 58 within a vicinity of a toilet area. When a person comes within range of the toilet 45, the signal is reflected by the body of the person and a receiver (not shown), such as an ultrasound receiver or infrared receiver, will receive a modulated signal through opening 62', thus detecting the presence of the person. The sensor 14 relays this signal to the actuator 12 via wire 48 or via wireless transmissions, such as radio frequency transmissions. A delay circuit which delays the signal for a predetermined time can be used to ensure that there is a person using the toilet 45, and not just passing by. When the person finishes and leaves the toilet area, a modulated signal is not received by the receiver, thus indicating that no person is present. When this occurs, the motor 20 is activated and rotates the gear train 18, the rotation of which will rotate shaft 26 of rotating arm 24.

FIGS. 1, 3A, 3B, 4A, 4B, 5A and 5B show the clutch feature for use with the actuator 12 made in accordance with the present invention. FIG. 1 shows the actuator 12 as installed in the reservoir tank 13. FIG. 3A shows the actuator 12 with the battery tray 78 exposed and with the round sensor 72 and the rectangular sensor 68. Both the round sensor 72 and the rectangular sensor 68 can be electrically coupled to the actuator 12 by connecting the respective female member 85 to the male member 86 of the actuator 12.

Figure 4A:
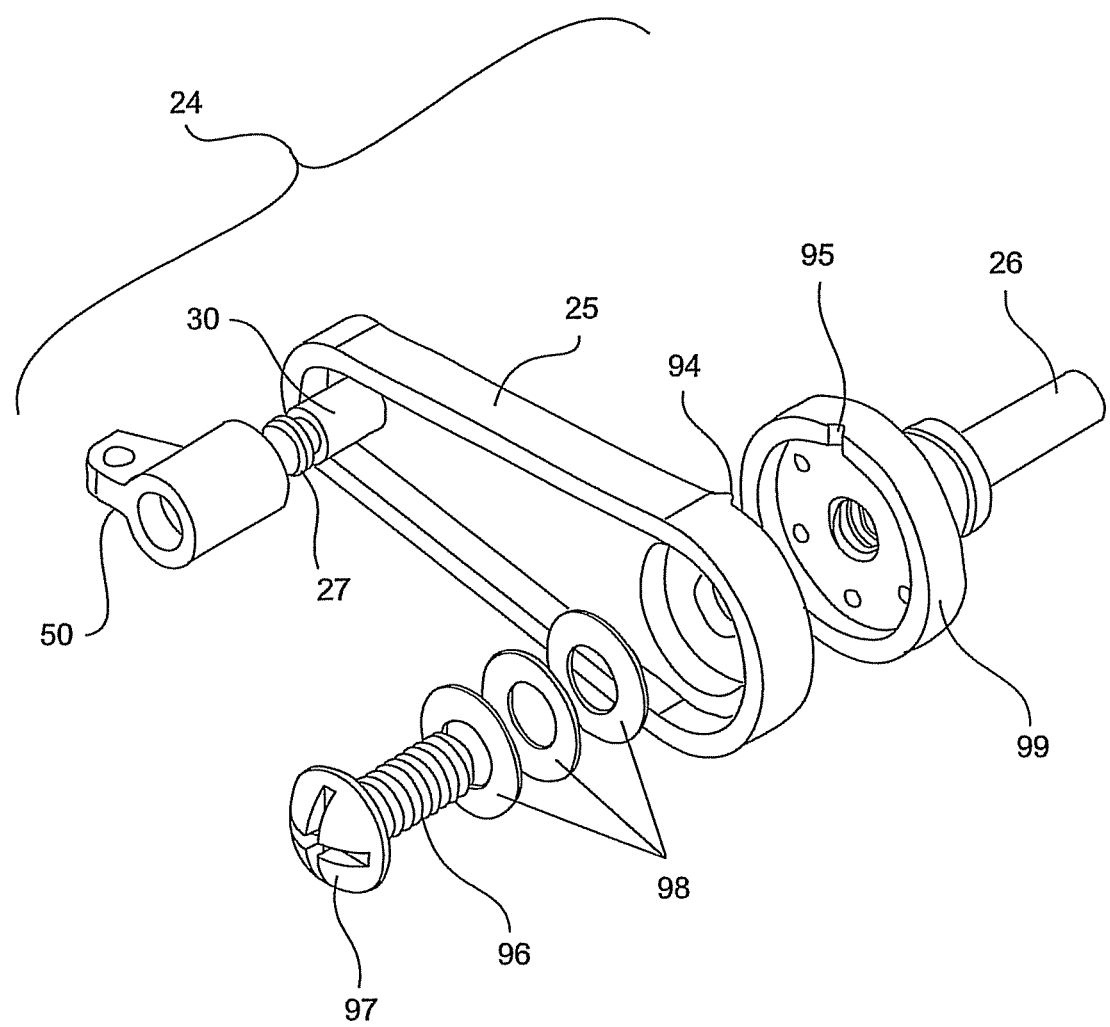
FIG. 4A is an exploded view of the external rotating arm having a clutch for the actuator including an engaging member according to a first embodiment in accordance with the present invention including a series of bevel washers acting as a biasing member.
Figure 4B:
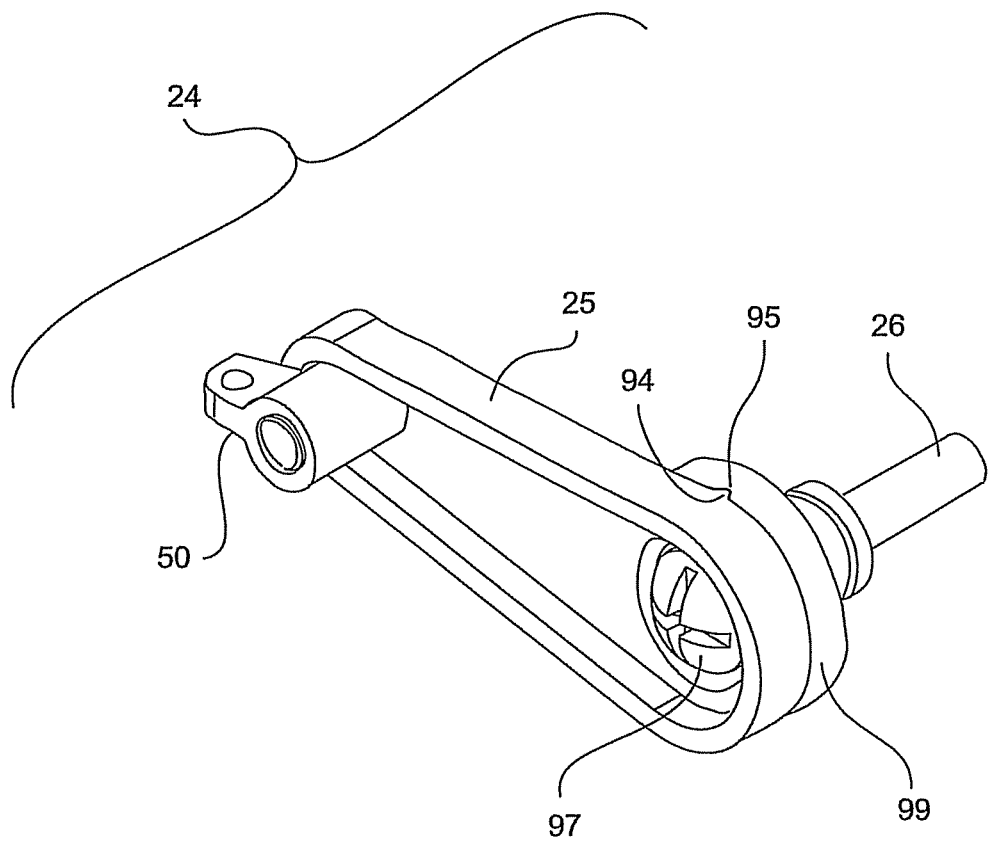
FIG. 4B is a view of the rotating arm and clutch of FIG. 4A in an engaged position.
Figure 4C:
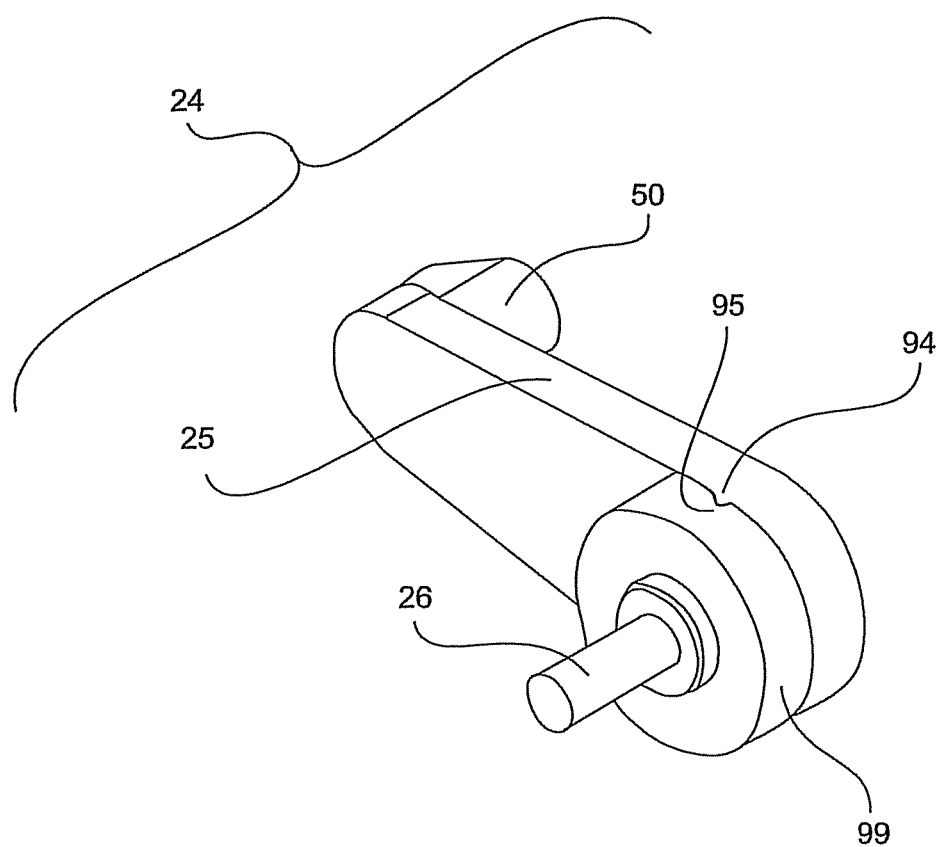
FIG. 4C is a rear view of the rotating arm of FIG. 4A.
Figure 6:
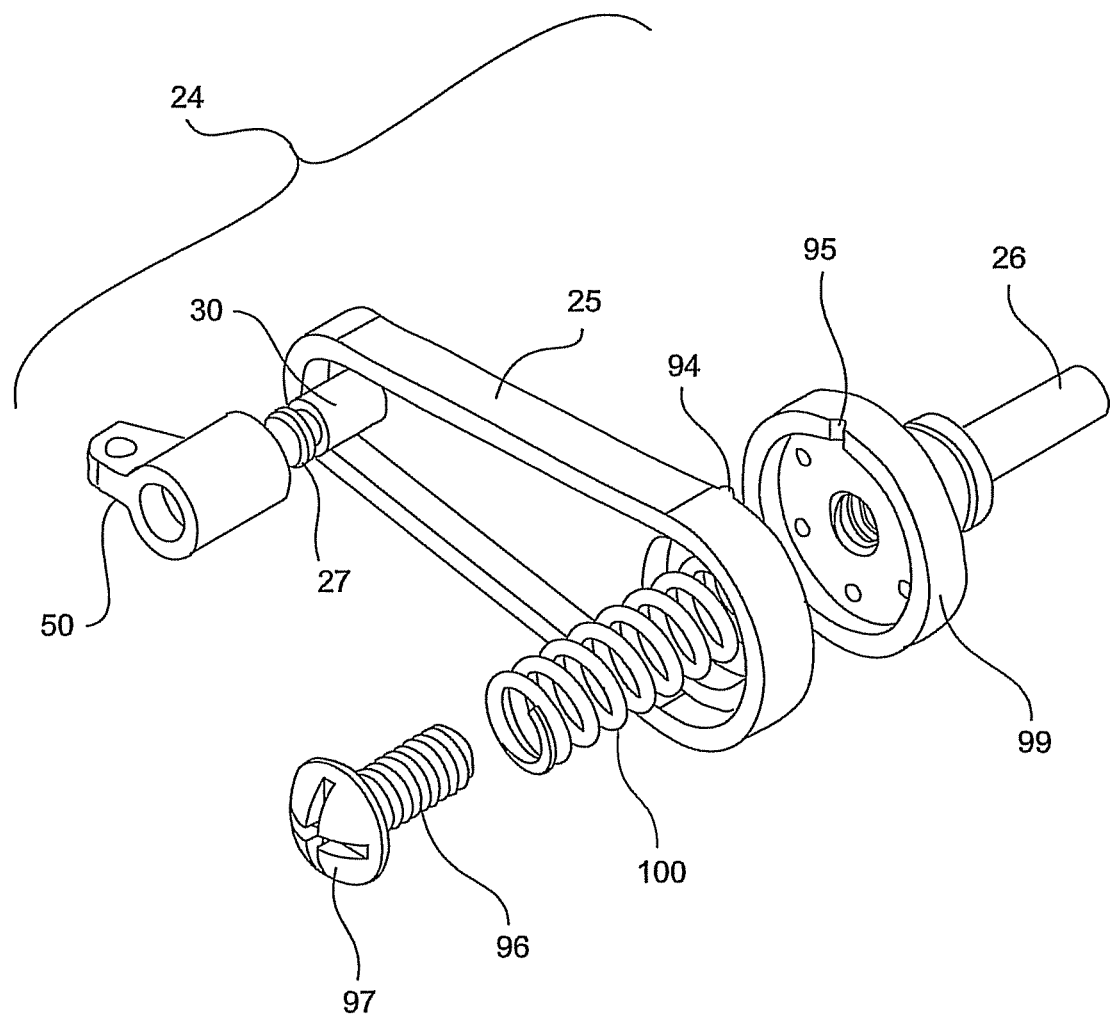
FIG. 6 is an exploded view of the external rotating arm having a clutch for the actuator in accordance with the present invention including a spring acting as a biasing member.

FIG. 4A shows an exploded view of the external arm 24 used for lifting the flapper valve 76 to drain the reservoir tank 13 shown in FIG. 1. The arm 24 contains the clutch feature of the invention to be described below. The arm 24 contains a rotatable body 25, which includes a first engaging member, which may be a male member 94, as shown more clearly in FIG. 4C. Attached to the body 25 is the tab 27 and shaft 30 to which the handle swivel 50 can be attached. The arm 24 rotates one revolution, or 360 degrees, to lift and then lower flapper 76. The male member 94 on the body 25 is received by a second engaging member, which may be a female member 95 located on a clutch disk 99, as shown in FIG. 4B. The clutch disk 99 is connected to a drive shaft 26, which is driven by the motor 20. The body 25 is connected to the clutch disk 99 by a fastener 96, such that a head 97 of the fastener 96 is spaced from the body 25 by a biasing member, such as a series of three bevel washers 98. The bevel washers 98 have spring-like properties and are positioned to co-act with the body 25 and the clutch disk 99 to bias the body 25 towards the clutch disk 99. Preferably, the bevel washers 98 are positioned or caged between the body 25 and the clutch disk 99. A spring 100, as shown in FIG. 6, may be used in lieu of the bevel washers 98. The biasing member may alternatively comprise a rubber washer or any other well-known member having spring-like properties capable of applying a biasing force to the body 25.

Figure 5A:
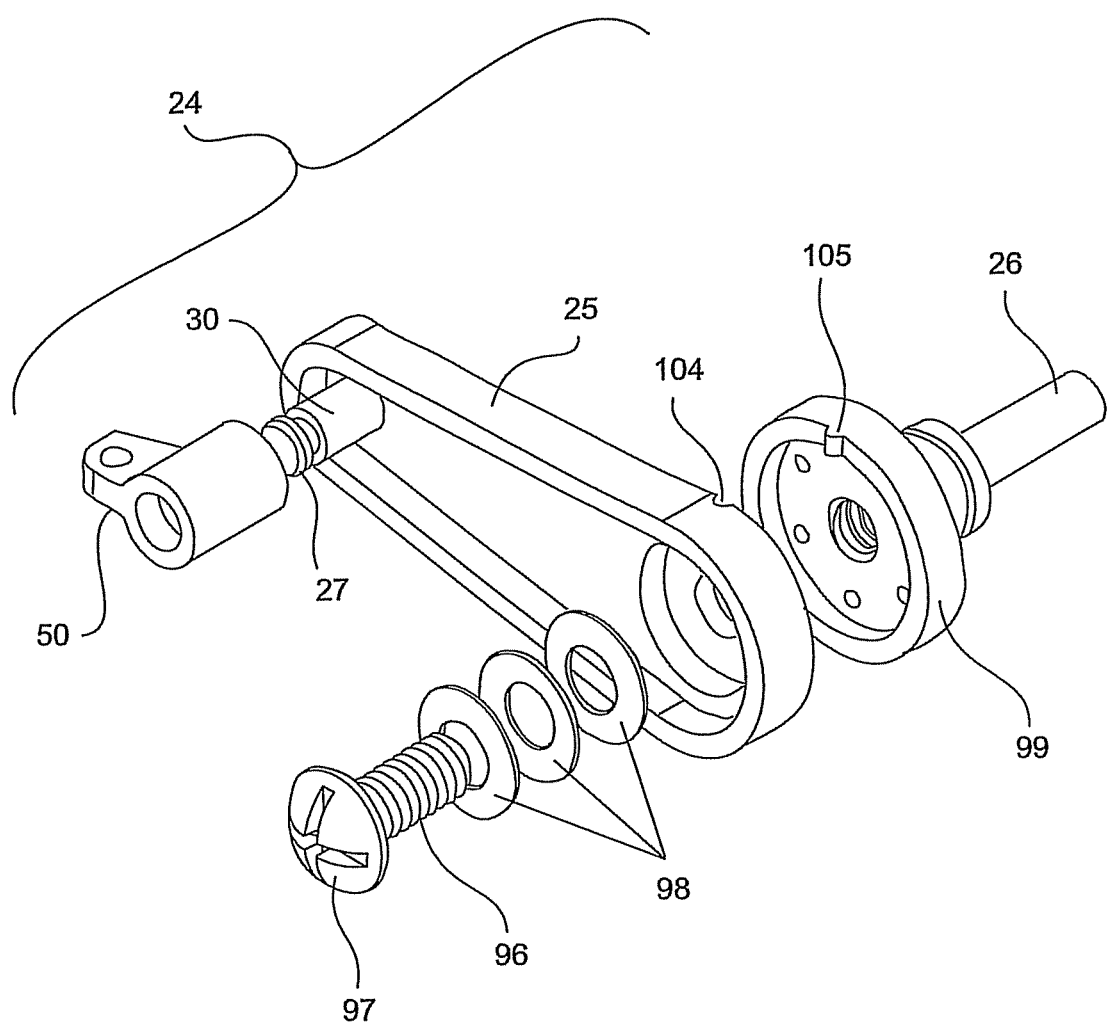
FIG. 5A is an exposed view of the external rotating arm having a clutch for the actuator including an engaging member according to a second embodiment in accordance with the present invention.
Figure 5B:
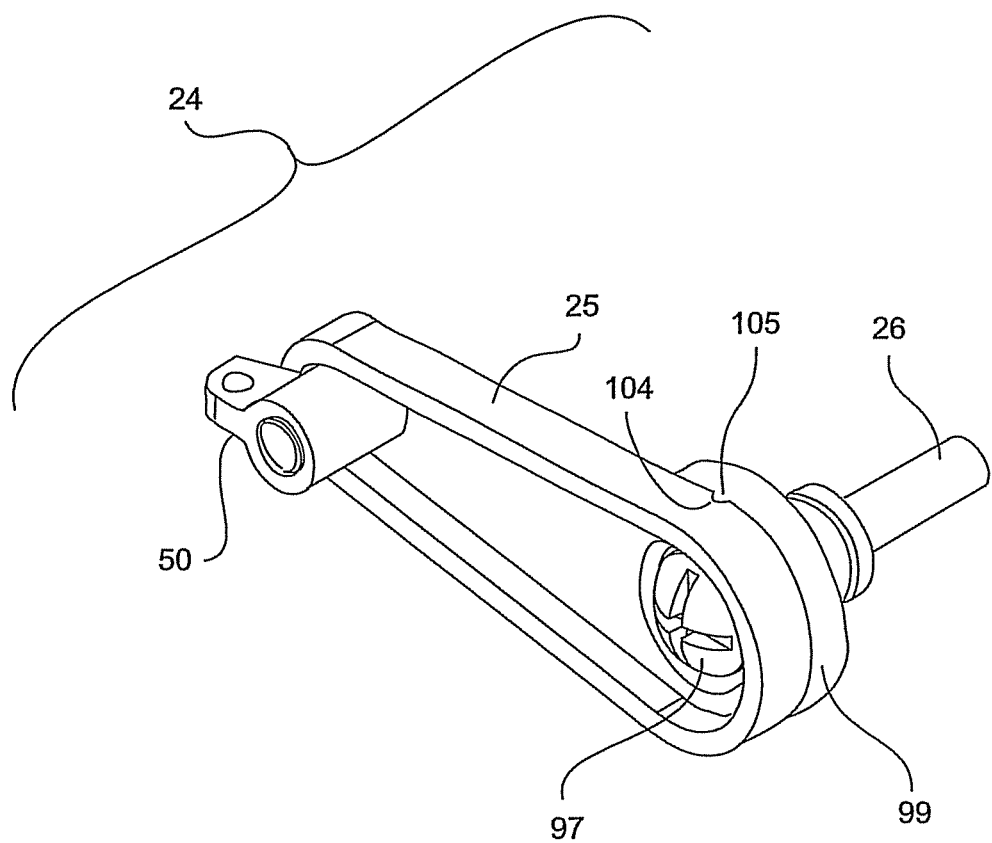
FIG. 5B is a view of the rotating arm and clutch of FIG. 5A in an engaged position.
Figure 5C:
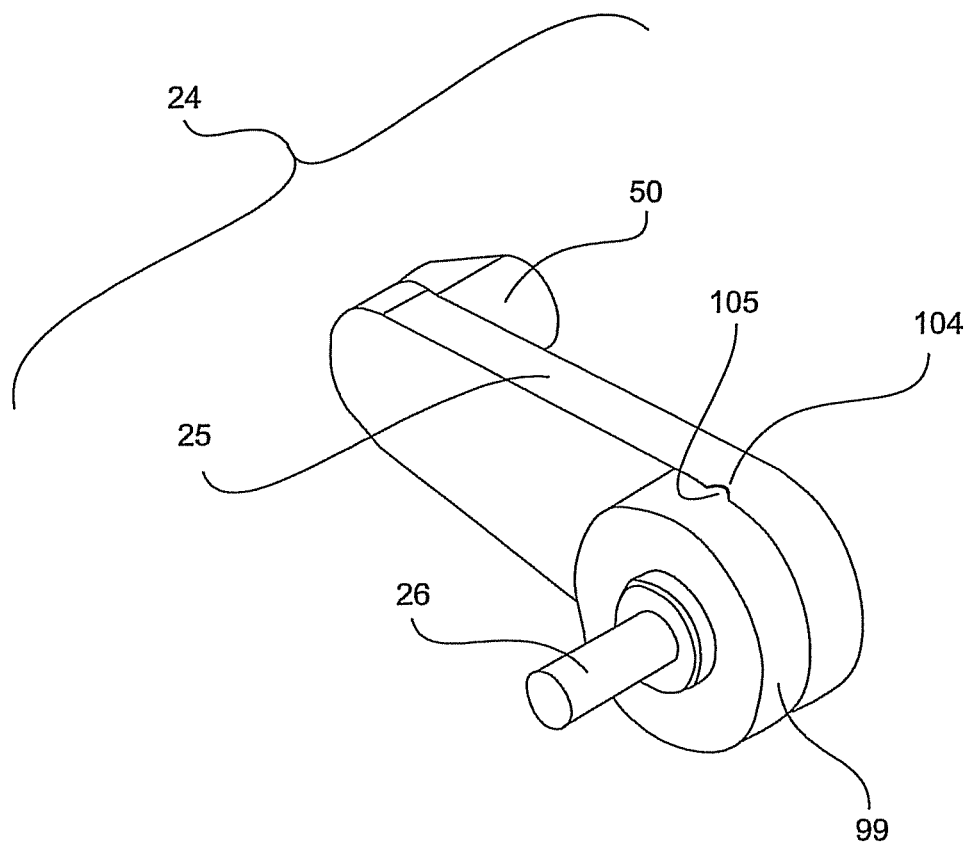
FIG. 5C is a rear view of the rotating arm of FIG. 5A.

As shown in FIGS. 5A-5C, an alternative design shows the first engaging member on body 25 as a female member 104 and the second engaging member on the clutch disk 99 as a male member 105.

Referring to FIG. 1, in the event that the flapper valve 76 should become stuck or otherwise unable to be pulled open by the chain 49, the drive shaft 26 could become damaged or the motor 20 could burn out due to the excessive torque. The external arm 24 prevents such damage from occurring. During normal operation, the first engaging member 94, 104 of the body 25 remains engaged with the second engaging member 95, 105 of the clutch disk 99. As the drive shaft 26 begins to rotate through its 360 degree cycle, the chain 49 is pulled by the tab 27 or handle swivel 50 attached to the body 25 of the arm 24. During the first 180 degrees of the rotation of drive shaft 26, the chain 49 lifts the flapper valve 76 allowing the reservoir tank 13 to be drained. Up on completion of the rotation, the flapper valve 76 is closed.

In the event that the torque from the motor exceeds a fixed torque, such as 2.5 inch pounds, the first engaging member 94, 104 disengages from the second engaging member 95, 105 by compressing the biasing member such as in the form of bevel washers 98, as shown in FIG. 4A, or a spring 100, as shown in FIG. 6. In this manner, the torque cannot reach a failure mode, such as the 7.5 inch pound limit at which there is a risk of damage to the drive shaft 26 or motor 20. The body 25 continues to slip along the clutch disk 99 until the 360 degree rotation of the drive shaft 26 is complete. At this point, the first engaging member 94, 104 and second engaging member 95, 105 re-engage with the biasing force of the biasing member 98, 100. The external arm 24 is then ready to resume normal operation.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An automatic toilet flushing system having a reservoir tank, said system comprising:
   a sensor for sensing the approach and departure motion of a user with respect to the toilet and for generating a signal representative of the approach and departure motion of the user;
   an actuator in communication with the sensor for causing an automatic flushing of the toilet in response to the signal from the sensor, wherein the actuator comprises a motor output shaft coupled to a rotatable body via a clutch at a first end of the rotatable body; and
   a flushing mechanism co-acting with the actuator, wherein the flushing mechanism includes a flapper valve, wherein the flapper valve is connected to a second end of the rotatable body such that rotation of the motor output shaft creates linear motion at the second end of the rotatable body to lift the flapper valve, whereby the flapper valve is adapted to release water from the reservoir tank upon actuation of the toilet flushing system.

2. The automatic toilet flushing system of claim 1, wherein the rotatable body includes a handle swivel at the second end of the rotatable body and a connector for connecting the handle swivel to the flapper valve.

3. The automatic toilet flushing system of claim 2, wherein the motor output shaft is coupled to the rotatable body by a rotatable body extending therebetween, said body including a first engaging member extending in one of an outward direction or inward direction with respect to said body.

4. The automatic toilet flushing system of claim 3, wherein said clutch comprises a clutch disk secured to said motor output shaft, said clutch disk including a second engaging member adapted for cooperating with said first engaging member of said body.

5. The automatic toilet flushing system of claim 4, wherein said first engaging member comprises a male member extending in an outward direction with respect to said body and said second engaging member comprises a female member adapted for cooperating with said male member.

6. The automatic toilet flushing system of claim 4, wherein said first engaging member comprises a female member extending in an inward direction with respect to said body and said second engaging member comprises a male member adapted for cooperating with said female member.

7. The automatic toilet flushing system of claim 4, wherein said body is secured to said clutch disk and said motor output shaft with a fastener, said fastener including a head positioned a predetermined distance from said body.

8. The automatic toilet flushing system of claim 7, wherein said clutch includes a biasing member co-acting with said body and said head for applying a biasing force to said body to force said body toward said clutch disk.

9. The automatic toilet flushing system of claim 8, wherein said body is adapted to overcome said biasing force should a predetermined torque on said motor output shaft be exceeded to disengage said first engaging member of said body from said second engaging member of said clutch disk.

10. The automatic toilet flushing system of claim 8, wherein said biasing member comprises at least one bevel washer.

11. The toilet flushing system of claim 10, wherein said biasing member comprises a plurality of bevel washers.

12. The automatic toilet flushing system of claim 8, wherein said biasing member comprises a spring.

13. A clutch assembly for coupling a motor output shaft with a rotatable body of an actuator for use with an automatic toilet flushing system, wherein said actuator is used for lifting the flapper valve within a toilet reservoir tank to flush the toilet, said motor output shaft adapted for rotation via a motor in said actuator, said clutch assembly comprising:
   a rotatable body extending between said motor output shaft and said rotatable body, said body including a first engaging member;
   a clutch disk secured to said motor output shaft, said clutch disk including a second engaging member adapted for cooperating with said first engaging member of said body; and
   a fastening member for securing said clutch disk to said motor output shaft, said fastening member including a head positioned a predetermined distance from said body.

14. The clutch assembly of claim 13, including a biasing member co-acting with said body and said head for applying a biasing force to said body to force said body toward said clutch disk.

15. The clutch assembly of claim 14, wherein said body is adapted to overcome said biasing force should a predetermined torque on said motor output shaft be exceeded to disengage said first engaging member of said body from said second engaging member of said clutch disk.

16. The clutch assembly of claim 14, wherein said biasing member comprises at least one bevel washer.

17. The clutch assembly of claim 16, wherein said biasing member comprises a plurality of bevel washers.

18. The clutch assembly of claim 14, wherein said biasing member comprises a spring.

19. The clutch assembly of claim 14, wherein said biasing member causes said first engaging member and said second engaging member to re-engage with one another upon a complete rotation of said body.

20. The clutch assembly of claim 13, wherein said first engaging member comprises a male member extending in an outward direction with respect to said body and said second engaging member comprises a female member adapted for cooperating with said male member.

21. The clutch assembly of claim 13, wherein said first engaging member comprises a female member extending in an inward direction with respect to said body and said second engaging member comprises a male member adapted for cooperating with said female member.

22. A method of coupling a motor output shaft with a rotatable body of an actuator for use with an automatic toilet flushing system, wherein said actuator is used for lifting a flapper valve within a toilet reservoir tank to flush the toilet, said motor output shaft adapted for rotation via a motor in said actuator, said method comprising:

positioning a rotatable body extending between said motor output shaft and said rotatable body, said body including a first engaging member;

providing a clutch disk secured to the motor output shaft including a second engaging member adapted for cooperating with said first engaging member of said body; and securing said clutch disk to said motor output shaft with a fastening member, said fastening member including a head positioned a predetermined distance from said body.

23. The method of claim 22, including positioning a biasing member such that it is adapted to co-act with said body and said head for applying a biasing force to said body to force said body toward said clutch disk.

24. The method of claim 23, wherein said body is adapted to overcome said biasing force should a predetermined torque on said motor output shaft be exceeded to disengage said first engaging member of said body from said second engaging member of said clutch disk.

25. The method of claim 23, wherein said biasing member is adapted to cause said first engaging member and said second engaging member to re-engage with one another upon a complete rotation of said body.

* * * * *

UNITED STATES PATENT AND TRADEMARK OFFICE
CERTIFICATE OF CORRECTION

PATENT NO.       : 8,615,821 B2                                 Page 1 of 1
APPLICATION NO.  : 12/129849
DATED            : December 31, 2013
INVENTOR(S)      : Funari It is certified that error appears in the above-identified patent and that said Letters Patent is hereby corrected as shown below:

On the title page, Item [57], Line 6, delete "aim" and insert -- arm --

In the Claims

Column 8, Line 46, Claim 11, after "The" insert -- automatic --

Signed and Sealed this
Sixteenth Day of September, 2014

Michelle K. Lee
*Deputy Director of the United States Patent and Trademark Office*